(12) United States Patent
Perkins

(10) Patent No.: US 7,676,985 B1
(45) Date of Patent: Mar. 16, 2010

(54) SYSTEM AND DEVICE FOR PEST MONITORING AND ERADICATION

(76) Inventor: Robert T. Perkins, 492 Tuscarora Dr., San Jose, CA (US) 95123

( * ) Notice: Subject to any disclaimer, the term of this patent is extended or adjusted under 35 U.S.C. 154(b) by 178 days.

(21) Appl. No.: 11/757,828

(22) Filed: Jun. 4, 2007

(51) Int. Cl.
*A01M 1/14* (2006.01)
(52) U.S. Cl. .......................... 43/114; 43/58
(58) Field of Classification Search ............. 43/58, 43/114
See application file for complete search history.

(56) References Cited

U.S. PATENT DOCUMENTS

| | | | | |
|---|---|---|---|---|
| 2,177,670 | A * | 10/1939 | Peirson | 43/107 |
| 3,304,646 | A | 2/1967 | Staley | |
| 3,398,478 | A | 8/1968 | Pearsall | |
| 3,908,302 | A | 9/1975 | Carr | |
| 4,031,654 | A * | 6/1977 | Gray | 43/114 |
| 4,044,495 | A | 8/1977 | Nishimura et al. | |
| 4,048,747 | A * | 9/1977 | Shanahan et al. | 43/114 |
| 4,208,828 | A | 6/1980 | Hall et al. | |
| 4,217,722 | A * | 8/1980 | McMullen | 43/114 |
| 4,244,134 | A | 1/1981 | Otterson | |
| 4,263,740 | A | 4/1981 | Hemsarth et al. | |
| 4,349,981 | A * | 9/1982 | Sherman | 43/131 |
| 4,395,842 | A | 8/1983 | Margulies | |
| 4,425,731 | A | 1/1984 | Orlando | |
| 4,709,504 | A * | 12/1987 | Andric | 43/114 |
| 4,800,671 | A * | 1/1989 | Olson | 43/108 |
| 4,819,371 | A * | 4/1989 | Cohen | 43/131 |
| 4,862,638 | A * | 9/1989 | Stevenson | 43/114 |
| 4,876,823 | A * | 10/1989 | Brunetti | 43/114 |
| 5,396,729 | A | 3/1995 | Vejvoda | |
| D362,045 | S | 9/1995 | Demarest | |
| 5,454,186 | A * | 10/1995 | Gang | 43/114 |
| 5,502,919 | A * | 4/1996 | Ciarletta | 43/131 |
| 5,572,825 | A | 11/1996 | Gehret | |
| 5,577,342 | A * | 11/1996 | Johnson et al. | 43/114 |
| 5,588,250 | A | 12/1996 | Chiba et al. | |
| 5,608,988 | A * | 3/1997 | Dowling et al. | 43/114 |
| 5,768,821 | A * | 6/1998 | Currey | 43/114 |
| 5,815,981 | A * | 10/1998 | Dowling et al. | 43/114 |
| 6,161,327 | A * | 12/2000 | Thomas | 43/115 |
| 6,594,947 | B2 * | 7/2003 | Lingren et al. | 43/114 |
| 6,651,378 | B2 | 11/2003 | Baker | |
| 6,675,789 | B2 * | 1/2004 | Pearce et al. | 124/56 |
| 6,877,270 | B2 * | 4/2005 | Nelson et al. | 43/58 |
| 6,998,133 | B2 * | 2/2006 | Simpson | 424/409 |
| 2002/0124457 | A1* | 9/2002 | Cosenza | 43/114 |
| 2003/0070347 | A1* | 4/2003 | Lingren et al. | 43/114 |
| 2004/0216367 | A1 | 11/2004 | Klein | |
| 2006/0260183 | A1* | 11/2006 | Hockaday | 43/129 |
| 2006/0265942 | A1* | 11/2006 | Watson | 43/114 |
| 2008/0052982 | A1* | 3/2008 | Windsor | 43/114 |
| 2008/0115406 | A1* | 5/2008 | Duston et al. | 43/131 |

* cited by examiner

*Primary Examiner*—Kurt Rowan
(74) *Attorney, Agent, or Firm*—Charles L. Thoeming

(57) ABSTRACT

A system and device for pest monitoring and eradication includes member having a dark crack and crevice environment for attracting, housing, retaining, and eradicating bedbugs and other similar pests. The system and device provides for boundary barriers adaptable to the perimeter of interconnected planar surfaces to maximize bedbug population monitoring and eradication activities.

7 Claims, 2 Drawing Sheets

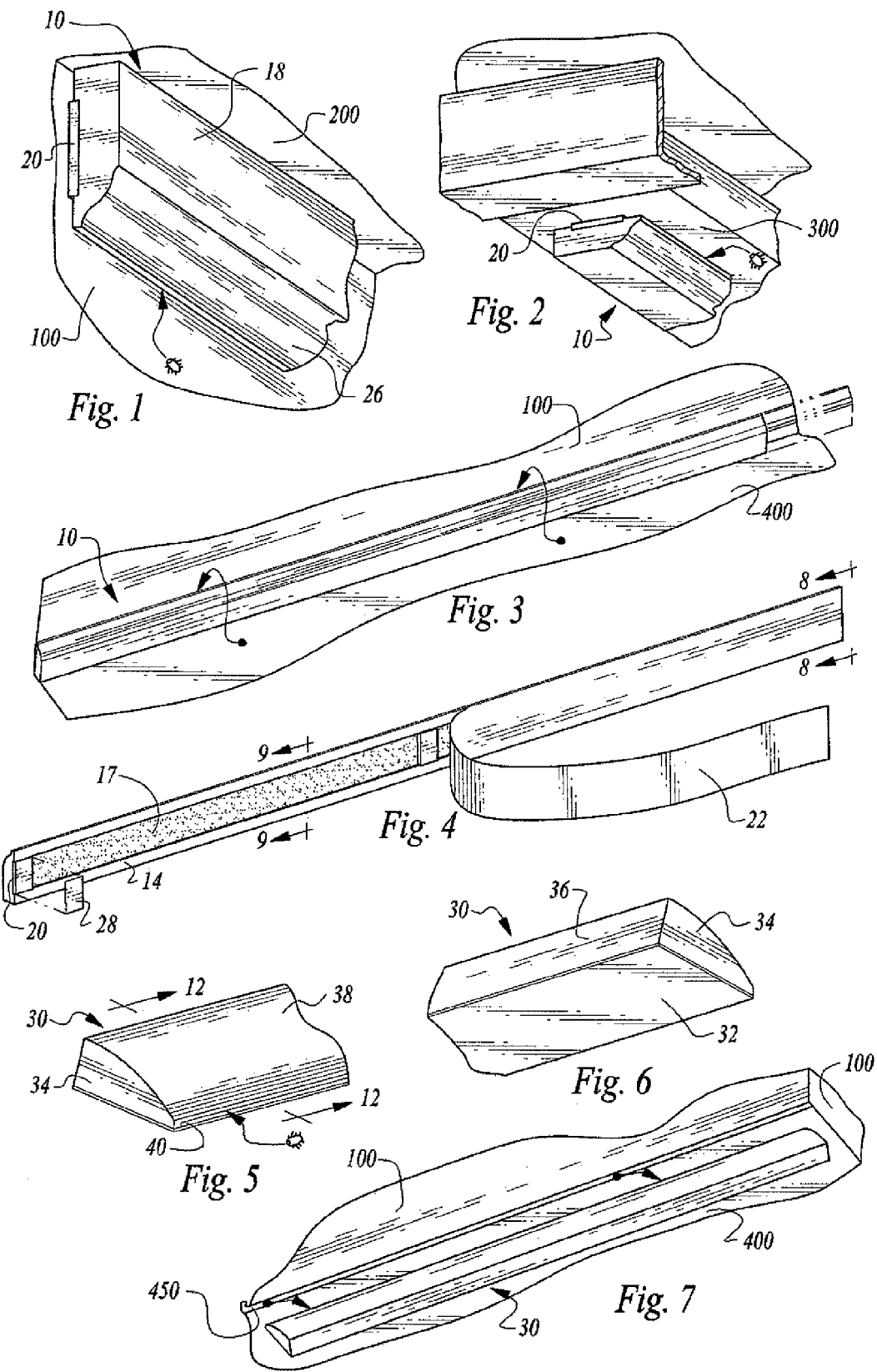

SYSTEM AND DEVICE FOR PEST MONITORING AND ERADICATION

CROSS REFERENCES TO RELATED APPLICATIONS

None.

STATEMENT REGARDING FEDERALLY SPONSORED RESEARCH OR DEVELOPMENT

None.

THE NAMES OR PARTIES TO A JOINT RESEARCH AGREEMENT

None.

INCORPORATION-BY-REFERENCE OF MATERIAL SUBMITTED ON A COMPACT DISC

None.

TECHNICAL FIELD

This invention relates generally to monitoring and eradication of vermin or pests, such as insects. More specifically, the present invention is concerned with an analysis system for monitoring the location, traffic patterns, and population density concentrations of bedbug infestation in dwellings and efficient extermination the bedbugs.

BACKGROUND OF THE INVENTION

Vermin and pest infestation in homes, motels, hotels and dormitories in the United States has been on the rise in recent years.

For instance, bedbugs were nearly eradicated in the United States 50 years ago when exterminators and homeowners used DDT; however, resistant strains of "super" bedbugs are today infesting mattresses at an alarming rate. Pest control companies nationwide reported a 71 percent increase in bedbug calls between 2000 and 2005. Left along, a few bedbugs can create a colony of thousands within weeks. Similar statistics show an increase in nationwide infestation levels for other nocturnal pests, such as cockroaches, silver fish and crickets.

Bedbug characteristics are illustrative of the problems in monitoring and eradicating many of these pests in general and include many of the following:

1. They are wingless insects of the family cimicidae;
2. They have small, flat, oval, reddish brown bodies, with an adult being about the size of an apple seed;
3. They feed on human and animal blood;
4. They are active at night and bite any areas of exposed skin;
5. They can infest indoor areas and hide in crevices or cracks in beds, furniture, and around ceilings, floors and walls;
6. Females lay from 300 to 500 eggs, which are covered with a sticky substance and which hatch in about ten days. There are five progressively larger nymphal stages, each requiring a single blood meal before molting to the next stage;
7. They can go without feeding for as long as 550 days;
8. They can suck up to six times its weight in blood, and feeding can take 3 to 10 minutes; and
9. Adults live about 10 months, and there can be up to three to four generations of bedbugs per year.
10. They are known to be thigmotropic; they favor environments which provide thigmotropic stimulation such as tight spaces which caress, comb, or touch them.
11. They love darkness and are, therefore, attracted to dark environments.
12. They prefer focal-fecal-point environments, which means they favor crowded environments surrounded by large numbers of their own and their excrement.

It is believed the resurgence of insect pests, such as bedbugs, is the result of increased global travel and a shift-toward less-toxic pest control. Bedbugs are most frequently found in dwellings with a high rate of occupant turnover, such as hotels, motels, hostels, dormitories, shelters, apartment complexes, tenements, and prisons.

Pest eradication and monitoring systems and apparatus are well known constructions typically employing housings or containers with opening and trapping means for the pests once they have entered the housing or container. The following U.S. patents disclose systems and apparatus believed to be representative of the current state of the prior art: U.S. Pat. No. 4,208,828, issued Jun. 24, 1980, U.S. Pat. No. 4,217,722, issued Aug. 19, 1980, U.S. Patent Publication No. 2004/0216367, published Nov. 4, 2004, U.S. Pat. No. 5,396,729, issued Mar. 14, 1995, U.S. Pat. No. 4,395,842, issued Aug. 2, 1983, U.S. Pat. No. 4,425,731, issued Jan. 17, 1984, U.S. Pat. No. 4,263,740, issued Apr. 28, 1981, U.S. Pat. No. 4,244,134, issued Jan. 13, 1981, U.S. Pat. No. 4,044,495, issued Aug. 30, 1977, U.S. Pat. No. 3,398,478, issued Aug. 27, 1968, U.S. Pat. No. 6,651,378, issued Nov. 25, 2003, U.S. Pat. No. 3,304,646, issued Feb. 21, 1967, U.S. Pat. No. 3,908,302, issued Sep. 30, 1975, U.S. Pat. No. Des. 362,045, issued Sep. 5, 1995, U.S. Pat. No. 5,588,250, issued Dec. 31, 1996, and U.S. Pat. No. 5,572,825, issued Nov. 12, 1996.

Existing pest eradication and monitoring systems and apparatus fail to address the particular characteristics of these pests, in particular bedbugs, and as a result often unwittingly make the problem worse. Because bedbugs are fast moving, nocturnal blood feeders that do not feed on ant and cockroach baits, widespread use of bait type control is a factor implicated in the return of widespread return bedbug infestation.

The other failure of existing eradication methods for bedbugs is the lack of any systematic means to monitoring infestation levels and detect early stages of bedbug infiltration of dwelling areas. Many reported accounts detail wholesale disposal of furnishing possessions in infected areas coupled with thousands of dollars spent on pest control, only to have the bedbug infestation reappear upon human relocation to the supposedly "cleaned" environment. Loss of sleep, psychological trauma, and persistent skin irritation often result for human inhabitants who return during or after this cycle of infestation, treatment, and re-infestation.

DISCLOSURE OF INVENTION

The pest monitoring and eradication system disclosed and claimed herein comprises a unitary crack and crevice member consisting of a flat base and a quarter- to half-inch rise along one edge tapering to a thirty-second- to quarter-inch opening on the other edge. Alternative embodiments comprise predetermined lengths of baseboard or molding stock with at least two spacers giving a predetermined rise to the molding above a flat surface. The spacers can be adhesive strips with space tops adhered to the molding bottom and removable plastic on the spacer bottoms. The inside portion of crack and crevice baseboard or molding stock members may include concave or rectangular space within the stock which further comprises an adhesive, or adhesive coating. An embodiment of also includes means for eradicating the pests, such as a sorptive dust of fumed silica (a/k/a/ diatomaceous earth), pyrethroids, Gentrol®, permethrin, or dichlorvos, on the inside portion. Embodiments may also have concave or recessed spaces on the molding underside to hold either the adhesive coating or means for eradication, or both. Chemical attractant for the pests can be added to either the adhesive coating or means for eradicating the pests, or both, on the inside portion of crack and crevice members.

The length of the crack and crevice member varies, but is typically six inches to six feet, depending upon the environment to which it applies. The pest monitoring and eradication system disclosed and claimed herein is suitable for establishing perimeter based pest boundaries within dwellings by application to bed frames, headboards, or similarly constructed furniture, and dwelling floors and ceilings, and the system can be applied to create such boundaries on any interconnected planar surfaces. Use of an attractive molding for monitoring purposes on can provide an aesthetic means to combat bedbug invasions without alarming inhabitants of the dwelling or otherwise disturbing the ambience.

The crack and crevice members can be constructed of any wood, plastic or cardboard providing the specified structural characteristics. The pest monitoring and eradication system disclosed and claimed herein is particularly effective in evaluating the degree of infestation of nocturnal pests, such as bed bugs, cockroaches, silver fish, crickets, and the like, in a safe, non-poisonous application. The crack and crevice member dark interior and narrow opening edge or space under the molding opening provides a suitably attractive environment for such pests.

While the prior art indicated above does not teach or suggest the combination of structural features disclosed and claimed herein, it demonstrates the viability of the concept of providing means to monitor levels and areas of infestation prior to, during, and after treatment; it also teaches the importance of fixed attachment of pest monitor and treatment structural members resulting in fixing a complete perimeter between crack and crevice pest pathways and interior furnishings, as well as eliminating the use of isolated monitor/treatment apparatus, which often provide false degrees of infestation levels resulting in increased parasitic infestation.

The pest monitoring and eradication system disclosed and claimed herein relates to a system and device for pest monitoring and eradication which have a number of advantages over prior art constructions. The system and device for pest monitoring and eradication have superior boundary placement properties due to the constant and uniform contact between the apparatus and the desired areas of interior surfaces to be monitored and effectively eradicated. Due to the geometry of the apparatus and the surrounding interior provided therein, the barrier control is provided in any interior environment without disrupting the aesthetic of the environment or with undue notice to persons enjoying the environment.

Other features, advantages and objects of the pest monitoring and eradication system disclosed and claimed herein will become apparent with reference to the following description and accompanying drawings.

BRIEF DESCRIPTION OF DRAWINGS

FIG. 1 is a perspective view of the top side of an embodiment for system and device for pest monitoring and eradication 10 comprising predetermined lengths of baseboard or molding stock with at least two spacing strips giving a predetermined rise to the molding above a vertical planar surface 100 and depicting positioning of the embodiment at the intersection of perpendicular planar surfaces 100 and 200.

FIG. 2 is a perspective view of the embodiment of FIG. 1 depicting positioning of the embodiment on the underside of a horizontal planar surface 300.

FIG. 3 is a perspective view of the embodiment of FIG. 1 depicting positioning of an indefinite length of the embodiment at a baseboard position of a wall/floor 100/400 intersection, and further depicting the path of bedbug migration into the system and device for pest monitoring and eradication.

FIG. 4 is a perspective view of the bottom side of the embodiment of FIG. 1 depicting removal of the protective strip 22 to reveal spacing strip(s) 20, spacing strip protective tape 26; and the dark interior space with means for adhesively holding pests thereto 17.

FIG. 5 is a perspective view of the top side of an embodiment for system and device for pest monitoring and eradication 30.

FIG. 6 is a perspective view of the bottom side of the embodiment 30 of FIG. 5.

FIG. 7 is a perspective view of the embodiment 30 of FIG. 5 depicting positioning of an indefinite length of the embodiment at a near baseboard position of a wall/floor 100/400 intersection having existing cracks and crevices, and further depicting the path of bedbug migration into the system and device for pest monitoring and eradication.

MODES FOR CARRYING OUT THE INVENTION

Figure 8:
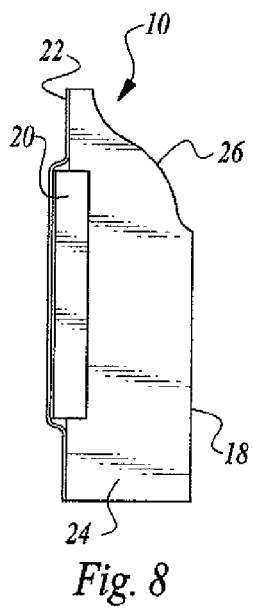
FIG. 8 is a cross-sectional view of the embodiment 10 of FIG. 4 depicting the planar side surface 24, protective strip 22, spacing strip(s) 20, and the contoured front surface 26.

Referring to FIGS. 1-14, a pest monitoring and eradication system in accordance with the teachings of the present invention is illustrated. The system comprises at least one molding strip assembly 10 or 12 having a top surface, a bottom surface, a front surface, a back surface, and side surfaces defining a molding strip of predetermined height, width, length dimensions. Each strip assembly 10 or 12 further comprises a dark interior space, 16 or 42, respectively, accessible from a crack or crevice opening in the molding strip surface. Each molding strip assembly 10 or 12 is configured to be removably attached to a secondary planar surface. Molding strip assembly 10 or 12 dark interior space contains one or more of the following features: 1) means for adhesively holding pests entering the space and preventing pests from escaping; 2) means for exterminating pests adhesively held in the dark interior space; and 3) an odor attractant detectable only to pests. Use of the system of molding strip assembly provides means for isolating an area using a configuration of a plurality of molding strips around the area.

An embodiment of assembly 10 for pest monitoring and eradication system of further comprises a planar top surface 18, a planar bottom surface 14, a contoured front surface 26, a planar back surface 36, and planar side surfaces 34, defining a molding strip of predetermined and desired height, width, length dimensions, FIGS. 1-4, 8-11, 13 and 14. This embodiment can be constructed from wood or plastic, and the contoured front surface allows use of the embodiment in environments where maintaining an aesthetic ambiance is important or necessary.

The pest monitoring and eradication assembly 10 is removably attached to a secondary planar surface using at least two spacing strips 20 of equal thickness. Each spacing strip 20 has an adhesive top surface and an adhesive bottom surface with removable protective tape 28 over the spacing strip adhesive surfaces until the bottom strip 22 protective surface is removed and each spacing strip 20 adhesive top side is applied to the molding bottom side and each spacing strip 20 bottom side is applied to the secondary planar surface by use of the spacing strips 20, FIGS. 4, 8, and 10. Once affixed to the secondary planar surface, the molding strip bottom surface 14 is parallel to the secondary planar surface 100 or 300 at a desired distance. This distance can vary but ranges optimally between one sixty-fourth of an inch to a quarter inch to take advantage of the thigmotropic characteristics and respective size of the pests being targeted for monitoring and eradication.

Bottom surface 14 and the secondary planar surface 100 or 300 define a certain dark interior space 16 between the molding strip assembly 10 and secondary planar surface 100 or 300 and within the molding strip assembly 10. This dark interior space 16 is accessible from the defined space between the molding strip bottom surface 14 and secondary planar surface 100 or 300, FIGS. 9, 11.

Figure 13:
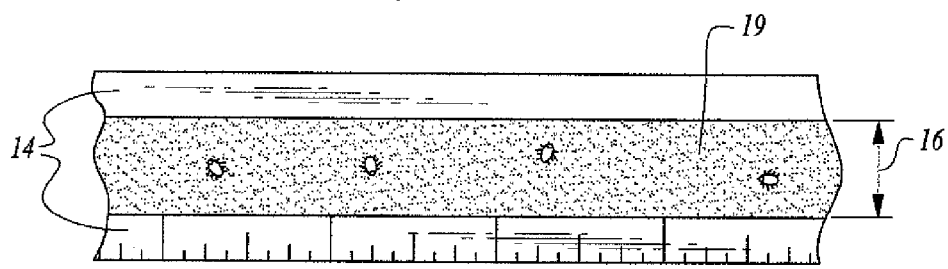
FIG. 13 is a bottom view of the embodiment 10 of FIG. 9 depicting planar bottom surface 14 and chemical means for exterminating pests 19 in the dark interior space 16.
Figure 14:
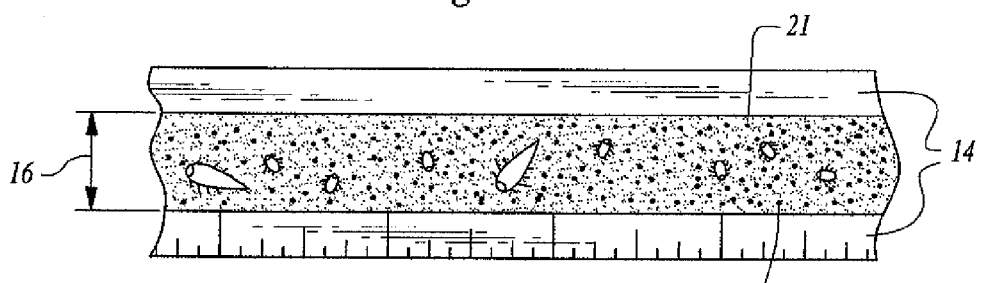
FIG. 14 is a bottom view of the embodiment 10 of FIG. 11 depicting planar bottom surface 14 and fumed silica means for exterminating pests 21 in the dark interior space 16.

Bottom surface 14 further comprises scaled markings on one side of the dark interior space 16 and surface for recording monitoring date and other data on the other side of the dark interior space 16, FIGS. 13 and 14. Using these scaled measuring markings and space to record monitoring information allows the assembly 10 to be removed for routine inspection in order to monitor relative infestation levels over predetermined time intervals, quickly and easily recording the results of the inspection on the bottom surface using standard marking pens, and re-positioning the assembly 10 in is place within the system perimeter or replacing it with a comparable length of assembly comprising means for extermination, depending on monitoring data. As such, the assembly 10 is an integral element in an overall integrated pest management plan to detail the methods and eradication agent(s) to be used in pest control.

The embodiment for pest monitoring and eradication assembly 10 comprises means for adhesively holding pests entering the dark interior space 16 using a non-drying adhesive coating 17, FIG. 4.

Figure 11:
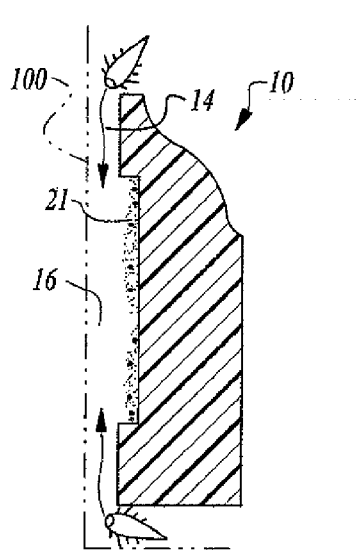
FIG. 11 is a cross-sectional view of the embodiment 10 of FIG. 10 constructed of plastic depicting larger size spacing strip(s) 20, the dark interior space 16, space between the planar bottom surface 14 and secondary planar surface 100, fumed silica means for exterminating pests 21, and pathway for bedbugs into the interior space.
Figure 12:
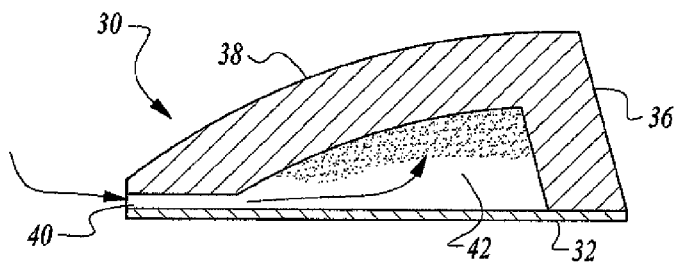
FIG. 12 is a cross-sectional view of the embodiment 30 of FIG. 5.

The embodiment for pest monitoring and eradication assembly 10 comprises means for exterminating pests adhesively held to the dark interior space 16 using fumed silica 21, FIG. 11.

Figure 9:
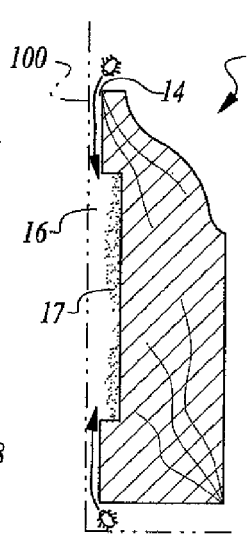
FIG. 9 is a cross-sectional view of the embodiment 10 of FIG. 4 constructed of wood depicting the dark interior space 16, space between the planar bottom surface 14 and secondary planar surface 100, chemical means for exterminating pests 19, and pathway for bedbugs into the interior space.
Figure 10:
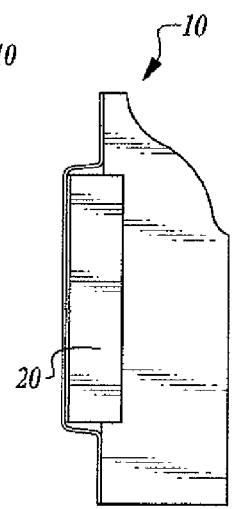
FIG. 10 is a cross-sectional view of the embodiment 10 of FIG. 8 depicting larger size spacing strip(s) 20.

The embodiment for pest monitoring and eradication assembly 10 comprises chemical means for exterminating pests 19 adhesively held to the dark interior space 16 using a member of the group consisting of pyrethroids, Gentrol®, permethrin, and dichlorvos, FIG. 9.

The embodiment for pest monitoring and eradication assembly 10 comprises means for a rotting coconut odor attractant, at a low level detectable only to pests, infused in the non-drying adhesive coating 17 of the dark interior space 16.

A second embodiment of assembly 30 for pest monitoring and eradication system comprises a planar front surface 40 comprising a thirty-second- to quarter-inch crack or crevice opening providing access to a dark interior space 42 within the assembly 30, a planar bottom surface 32, a quarter- to half-inch planar back surface 36, tapering top surface 38, and planar side surfaces 34, FIGS. 5-7, 12. This crack or crevice opening is sized to take advantage of the thigmotropic characteristics and respective size of the pests being targeted for monitoring and eradication.

The assembly 30 can be attached a secondary planar surface using two sided adhesive tape with removable protective tape over the adhesive surfaces until one tape side is applied to the molding bottom side and the other tape side is applied to the secondary planar surface.

The assembly 30 further comprises means for adhesively holding pests entering the dark space within the molding strip comprises non-drying adhesive coating.

The assembly 30 further comprises means for exterminating pests adhesively held to the dark interior space 42 comprises fumed silica.

The assembly 30 further comprises means for exterminating pests adhesively held to the dark interior space using a member of the group consisting of pyrethroids, Gentrol®, permethrin, and dichlorvos.

The assembly 30 further comprises means for a rotting coconut odor attractant, at a low level detectable only to pests, infused in the non-drying adhesive coating of the dark interior space 42.

The foregoing disclosure is sufficient to enable one having skill in the art to practice the invention without undue experimentation, and provides the best mode of practicing the invention presently contemplated by the inventor. While there is provided herein a full and complete disclosure of the preferred embodiments of this invention, it is not intended to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Accordingly, the proper scope of the present invention should be determined only by the broadest interpretation of the appended claims so as to encompass all such modifications as well as all relationships equivalent to those illustrated in the drawings and described in the specification.

I claim:

1. A pest monitoring and eradication system comprising:
    a) at least one molding strip assembly having a planar top surface, a planar bottom surface, a contoured front surface, a planar back surface, and planar side surfaces defining a molding strip of predetermined height, width, length dimensions;
    b) dark interior space within each molding strip accessible from a molding strip surface;
    c) means for removably attaching each molding strip to a secondary planar surface comprising a protective strip across the bottom surface, at least two spacing strips of equal thickness having adhesive top and bottom surfaces with removable protective tape over the spacing strip adhesive surfaces until the bottom strip protective surface is removed and each spacing strip adhesive top side is applied to the molding bottom side and each spacing strip bottom side is applied to the secondary planar surface; whereby the molding strip bottom surface is parallel to the secondary planar surface at a desired distance, the bottom surface and the secondary planar surface define an opening between the molding strip bottom and secondary planar surface, and the dark interior space within each molding strip is accessible from the opening;

d) means for adhesively holding pests entering the dark interior space and preventing pests from escaping; and e) means for exterminating pests adhesively held to the molding strip dark interior space;

whereby a plurality of molding strips are configured as a defined area perimeter.

2. The pest monitoring and eradication system of claim 1 wherein the molding strip bottom surface comprises scaled markings.

3. The pest monitoring and eradication system of claim 1 wherein the molding strip bottom surface comprises area for recording data.

4. The pest monitoring and eradication system of claim 1 wherein the opening ranges from one sixty-fourth of an inch to a quarter of an inch.

5. Pest monitoring and eradication apparatus comprising:

at least one molding strip having a planar top surface, a planar bottom surface, a contoured front surface, a planar back surface, and planar side surfaces defining a molding strip of predetermined height, width, length dimensions;

assembly for removably attaching each molding strip to a secondary planar surface, the assembly comprising a protective strip across the bottom surface, at least two spacing strips of equal thickness having adhesive top and bottom surfaces with removable protective tape over the spacing strip adhesive surfaces until the bottom strip protective surface is removed and each spacing strip adhesive top side is applied to the molding bottom side and each spacing strip bottom side is applied to the secondary planar surface; whereby the molding strip bottom surface is parallel to the secondary planar surface at a desired distance, the bottom surface and the secondary planar surface define an opening between the molding strip bottom and secondary planar surface;

dark interior space within each molding strip accessible from the opening between the molding strip bottom surface and the secondary planar surface;

non-drying adhesive coating for adhesively holding pests entering the dark interior space and thereby preventing pests from escaping; and means for exterminating pests adhesively held within the molding strip dark interior space.

6. The apparatus of claim 5, wherein means for exterminating pests adhesively held within the dark interior space comprises a member of the group consisting of fumed silica, pyrethroids, permethrin, and dichlorvos.

7. The apparatus of claim 5, further comprising an odor attractant detectable only to pests.

\* \* \* \* \*